United States Patent [19]

Rotter

[11] 4,308,103

[45] Dec. 29, 1981

[54] APPARATUS FOR THE PYROLYSIS OF COMMINUTED SOLID CARBONIZABLE MATERIALS

[75] Inventor: Franz Rotter, Portland, Oreg.

[73] Assignee: Energy Recovery Research Group, Inc., Portland, Oreg.

[21] Appl. No.: 155,515

[22] Filed: Jun. 2, 1980

[51] Int. Cl.³ .................. C10B 1/06; C10B 45/00; C10B 47/20; C10B 53/00

[52] U.S. Cl. .................. 202/117; 48/111; 201/25; 201/33; 202/135; 202/137; 202/265

[58] Field of Search ................ 202/87, 90, 109, 117, 202/118, 128, 137, 265, 269, 135; 201/2.5, 25, 33, 15, 27; 432/112, 151, 177; 366/144, 149; 422/204; 48/111, 113, 119

[56] References Cited

U.S. PATENT DOCUMENTS

| | | | |
|---|---|---|---|
| 1,379,187 | 5/1921 | Kaufman | 422/204 |
| 1,451,575 | 4/1923 | Holmes | 202/137 |
| 2,914,386 | 11/1959 | Shapleigh | 422/204 |
| 2,973,306 | 2/1961 | Chick et al. | 201/33 |
| 3,178,361 | 4/1965 | Bailey | 202/118 |
| 3,751,214 | 8/1973 | Wenzel et al. | 432/112 |
| 4,058,205 | 11/1977 | Reed | 202/218 |
| 4,123,332 | 10/1978 | Rotter | 202/117 |
| 4,169,767 | 10/1979 | Noguchi et al. | 201/33 |

*Primary Examiner*—Bradley Garris

*Attorney, Agent, or Firm*—Philip D. Junkins

[57] ABSTRACT

Apparatus for effecting the pyrolytic treatment of solid carbonizable materials, such as coal, shredded scrap-tires, comminuted municipal waste, sawdust and wood shavings, and the like. The treatment takes place in a cylindrical, horizontally-disposed reactor vessel including a material conveying device which transports the carbonizable materials through the vessel as a moving bed. A heating chamber is arranged coaxially around the reactor vessel and is configured as an annulus of substantially uniform inner diameter and of decreasing outer dimension from its forward end adjacent the materials outlet end of the reaction vessel, to its rearward end, adjacent the materials inlet end of such vessel. The material passing through the reaction vessel is subject to an indirect heat transfer relationship with a burning air-fuel mixture spirally swirling within the heating chamber and moving in a direction generally counter-current to the material passing through the reaction vessel. The burning air-fuel mixture and combusted gases are progressively constricted and confined by the heating chamber configuration and leave the heating chamber via an exhaust gas exit conduit located at a low point in the heating zone. During its passage through the reaction zone the material to be carbonized is converted by pyrolysis, or high-temperature destructive distillation, into combustible gases, liquid hydrocarbons and solid carbonaceous residues.

4 Claims, 3 Drawing Figures

APPARATUS FOR THE PYROLYSIS OF COMMINUTED SOLID CARBONIZABLE MATERIALS

BACKGROUND OF THE INVENTION

This invention relates to apparatus for the pyrolytic treatment of solid carbonizable materials, such as coal, shredded scrap-tires, comminuted municipal waste, sawdust and wood shavings, and the like, to convert same into valuable products including combustible gases, liquid hydrocarbons and solid carbonaceous residues. The treatment takes place in a cylindrical, horizontally-disposed vessel including a material conveying device which transports the carbonizable materials through the reactor vessel as a moving bed. A heating chamber is arranged coaxially around the reactor vessel.

The apparatus of this invention is an improvement on the pyrolysis apparatus disclosed and claimed in my earlier U.S. Pat. No. 4,123,332 entitled Process and Apparatus for Carbonizing a Comminuted Solid Carbonizable Material. According to the description in the aforementioned patent, solid carbonizable material is passed through a high-temperature, air-free reaction zone (defined by the reaction vessel) by paddle-like impellers mounted on a rotatable shaft which extends through the zone. The material passing through the reaction zone is subject to an indirect heat transfer relationship via a burning air-fuel mixture spirally swirling within the heating chamber which coaxially surrounds the reaction vessel. The burning air-fuel mixture travels in a direction generally counter-current to the material passing through the reaction zone and, after its substantially complete combustion, leaves the heating chamber via an exhaust gas exit conduit located at a low point in the heating zone. During its passage through the reaction zone the material to be carbonized is converted by pyrolysis, or high-temperature destructive distillation, into combustible gases, liquid hydrocarbons and solid carbonaceous residues.

The apparatus disclosed and claimed in my U.S. Pat. No. 4,123,332 is well suited for carrying out the pyrolysis of carbonizable materials and solid organic wastes containing hydrocarbons, particularly shredded scrap tires. It is important to the economics justifying the pyrolysis of scrap tires, and other organic materials, to obtain maximum heat transfer efficiency between the burning air-fuel mixture heating the reaction vessel wall and the material within the reaction vessel which is heated by heat conduction, convection and radiation. Also, fullest utilization of the heat value of the burning mixture within the heating chamber leads to improved apparatus and process heat balance efficiency.

OBJECTS OF THE INVENTION

Accordingly, an object of the present invention is to provide novel apparatus for converting solid organic waste materials and other solid carbonizable materials by pyrolysis to valuable products including combustible gases, liquid hydrocarbons, and solid carbonaceous residues.

Another object of the present invention is to provide novel apparatus for pyrolyzing solid carbonizable material in which the heating chamber, coaxially surrounding the pyrolysis reaction vessel, is configured to promote complete combustion of the burning air-fuel mixture spirally swirling therein whereby full utilization of the heat value of the burning mixture is effected in heating the reaction vessel.

A still further object of the present invention is to provide novel apparatus to convert a wide variety of solid carbonizable materials, particularly organic waste materials, to valuable products including combustible gases, liquid hydrocarbons, and solid carbonaceous residue while minimizing environmental air pollution.

SUMMARY OF THE INVENTION

These and other objects of the present invention are achieved in pyrolytic conversion apparatus wherein the materials to be pyrolyzed (in shredded, comminuted, granulated, chopped or other particulate form) are continuously introduced into the materials inlet end of an elongated, cylindrical, and substantially horizontal pyrolysis reaction vessel through an inlet channel and devices to effectively exclude oxygen-containing gases. The material entering the reaction vessel is continuously conveyed, with agitation, through the reaction zone defined by the reaction vessel to the materials outlet end of the vessel as a materials bed by a plurality of paddlelike impellers mounted on a rotatable shaft or pipe extending through the zone. The moving bed of solid material is heated to a pyrolyzing temperature of from about 400° C. to about 900° C. by conductive, convective and radiant heat transfer resulting from a spirally swirling burning air-fuel mixture surrounding the reaction vessel within a coaxial heating chamber. The coaxial heating chamber is configured as an annulus of substantial uniform inner diameter and of decreasing outer dimension from its forward end, adjacent the materials outlet end of the reaction vessel, to its rearward end, adjacent the materials inlet end of such vessel. The burning air-fuel mixture, spiralling about the reaction vessel, moves in a generally counter-current direction with respect to the moving bed of solid carbonizable material within the reaction vessel. The fully-combusted hot exhaust gases resulting from the burning air-fuel mixture leave the heating chamber through an exhaust gas exit located at a low point in the annular heating chamber adjacent its forward end. The material comprising the moving bed within the reaction vessel is thermally and progressively broken down to valuable products including gases, liquids and solid carbonaceous residues.

BRIEF DESCRIPTION OF THE DRAWINGS

The invention will be more clearly understood by reference to the following detailed description of exemplary embodiments thereof in conjunction with the accompanying drawings wherein like reference numerals designate like parts throughout, in which.

DETAILED DESCRIPTION OF THE INVENTION

Figure 1:
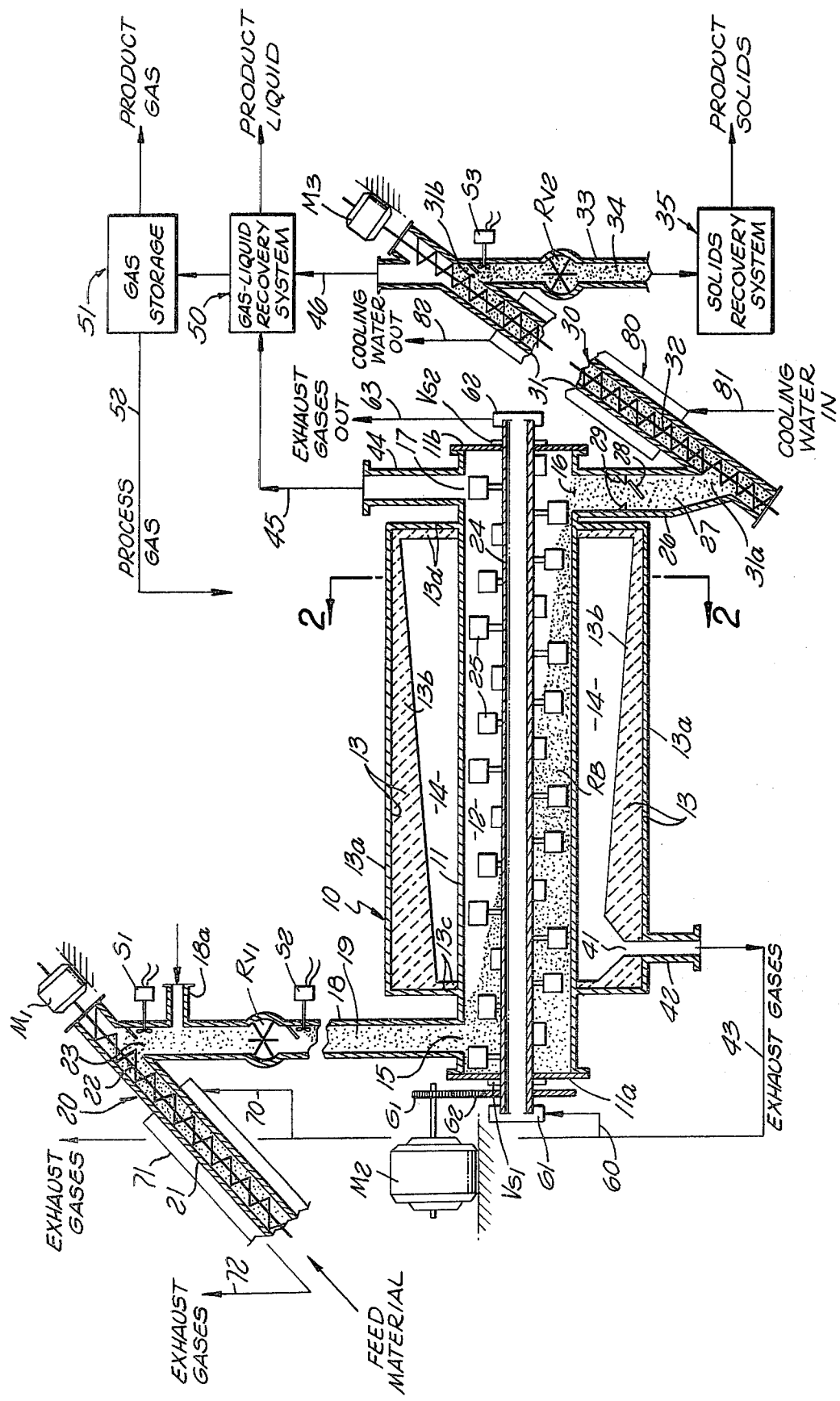
FIG. 1 is a side elevation, longitudinally sectioned, of pyrolysis apparatus for converting solid carbonizable material in accordance with the present invention.

According to FIG. 1 there is illustrated a preferred pyrolysis reaction system 10 which includes an elongated pyrolysis reaction vessel 11 of cylindrical configuration defining a pyrolysis reaction zone 12. The reaction vessel 11 has end wall 11a at its feed material inlet end and an end wall 11b at its product outlet end. Surrounding the reaction vessel, and spaced therefrom, is a jacket or vessel 13 comprised of an outer supporting wall 13a and an inner refractory wall 13b which defines with reaction vessel 11 an annular heating zone 14. The outer vessel 13 has end walls 13c and 13d. The vessel 13 extends substantially co-extensively along a major portion of the elongated reaction vessel 11. At the upper portion of reaction vessel 11 proximate the end wall 11a there is provided a reaction zone feed material inlet 15 and at the lower portion of the vessel 11 proximate the end wall 11b there is provided a reaction zone solid residue outlet 16. The upper portion of the reaction vessel 11 proximate the end wall 11b is provided with a reaction zone gas-vapor outlet 17.

The reaction vessel 11 and the outer supporting wall 13a of jacket or vessel 13 are constructed of high temperature nickel/steel alloy materials or other suitable materials capable of withstanding high temperature pyrolysis conditions that exist during the conversion of solid carbonizable material within reaction zone 12. The inner refractory wall 13b of jacket 13 is preferably constructed of castable alumina ceramic material capable of withstanding temperatures of up to 1600° C. The vessel 11 and jacket 13 are supported by appropriate structure (not shown) and are, at least over exterior surfaces in the vicinity of the gas-vapor outlet 17, enclosed with appropriate heat insulating material (not shown).

Communicating with the reaction zone 12 is a feed material inlet pipe or conduit 18 extending in a substantially vertical orientation (from the feed material inlet 15 in the reaction vessel 11) of a length sufficient such that the solid feed material therein forms a gravity packed feed material column 19 which assists in effectively sealing the inlet 15 of the reaction zone 12 from oxygen-containing gases. A rotary air lock or star valve $RV_1$ of well-known construction is located near the upper end of the feed material conduit 18 to further assure the exclusion of oxygen-containing gases from the reaction zone 12.

A feed material conveying system, generally indicated as 20 is provided for supplying solid carbonizable material to the material inlet conduit 18. Conveying system 20 is comprised of an elongated feed material conveyor housing 21 in which is positioned auger 22 of common design. The conveyor housing 21 includes at its upper end a materials exit port 23 connected to and in communication with the upper end of conduit 18 whereby feed material conveyed upwardly through the housing 21 by the rotating action of auger 22 is discharged through port 23 into the conduit above rotary valve $RV_1$. At the lower end of the conveyor housing 21 there is provided a material storage hopper (not shown). The feed material stored within such hopper is picked up by auger 22 and conveyed upwardly through the housing 21 for discharge into conduit 18. The auger is rotated by motor $M_1$ in response to material sensing means $S_1$ of known type located within conduit 18 so as to maintain a full head of feed material above rotary valve $RV_1$. A second sensing means $S_2$ located below valve $RV_1$ controls the rotation of such valve and thus the admission of feed material to the lower portion of conduit 18. As the column 19 of feed material in conduit 18 drops below sensing means $S_2$ the valve is rotated for a period of time sufficient to feed material into conduit 18 and re-establish the full height of feed material column 19. A side inlet 18a in conduit 18 may be provided for introducing inert gas to such column to further seal the system against oxygen-containing gases.

Extending axially through the pyrolysis reaction zone 12 is a rotatable shaft 24 mounted for rotation through end wall 11a and end wall 11b of the vessel 11. Appropriate shaft-to-wall vapor seals $VS_1$ and $VS_2$ are provided with the shaft 24 being preferably mounted at each end in self-aligning bearings (not shown) of any well-known construction. The shaft 24, as illustrated, comprises a hollow pipe and is provided over its entire length within the reaction zone 12 with a plurality of paddle-like impellers 25 disposed in sequence about the circumference thereof in the form of a broken helix. The impellers 25 preferably do not contact the inner surface of reaction vessel 11 but are of such length that relatively little clearance is provided between the impellers and the inner surface of the vessel 11. The spacing and shape of the impellers 25 are such that, upon rotation of pipe 24, the entire inner surface of the reaction vessel 11 is exposed to the action of the impellers. Upon rotation of pipe 24, the impellers 25 cooperate and act to convey material (entering the reaction zone through inlet 15) as a reaction bed RB of decreasing thickness from the inlet end to the outlet end of the reaction zone 12 and to continuously agitate the material forming such reaction bed RB. The solid materials of the reaction bed RB are heated to pyrolyzing temperatures by conductive heat energy passing through the wall of the reaction vessel 11 below the bed surface and directly into the bed and therethrough. The materials are also heated by radiant heat energy emanating from the wall of the reaction vessel 11 above the upper surface of the materials bed RB and radiated to the top of such bed. The pipe 24 is rotated by a variable speed motor $M_2$ through a gear train which, as illustrated, comprises gears $G_1$ and $G_2$. Motor $M_2$ is controlled as to its r.p.m. in relation to the predetermined throughput rate of the material passing through the reaction zone 12.

Solid carbonaceous residue formed within the reaction zone 12 during pyrolysis of the solid carbonizable material is moved toward the outlet end and leaves the reaction vessel 11 through outlet 16 through a solid residue exit conduit 26. The solid reaction within outlet exit conduit 26 forms a gravity packed column 27 which contributes to the sealing at the outlet end of the reaction zone 11 from oxygen-containing gases. The conduit 26 may also contain a flap valve arrangement 28 which, on a time-interval basis, releases the particulate solid residue to the lower portion of conduit 26. The flap valve 28 seats against the underside of an annular valve seat arrangement 29 within conduit 26.

A solid residue conveying and storage system, generally indicated as 30, is provided for receiving solid carbonized residue from outlet conduit 26 adjacent the outlet end of the reaction zone 12. Such system 30 is comprised of an elongated solid residue conveyor housing 31 provided with an auger 32 of common design and at its lower end with a solid residue inlet port 31a connected to and in communication with the lower end of outlet conduit 26 whereby solid residues passing downwardly through such conduit 26 are introduced into the conveyor housing 31. The auger 32 is driven by motor $M_3$ and conveys the solid residues from outlet conduit 26 through inlet port 31a within the conveyor housing 31 to conveyor outlet port 31b whereat such solid residues pass downwardly by gravity through solid residue conduit 33 as a packed second solid residue column 34. The solid residue column 34 is passed to a solids recovery system 35 (schematically shown in FIG. 1) wherein solid carbonaceous product materials and non-carbonized materials are separated. The solid residues conveyed through conveyor housing 31 and passing as a packed column through conduit 33 cooperate with the solid residues in outlet conduit 26 to effectively seal at its outlet end the reaction zone 12 from oxygen-containing gases. A rotary air lock or star valve $RV_2$ of well-known construction may be located in outlet conduit 33 near its upper end to further assure the exclusion of oxygen-containing gases from the reaction zone. A material sensing means $S_3$, of known type, is located in outlet conduit 33 above the star valve $RV_2$ in close proximity to conveyor outlet port 31b and actuates the star valve when the column of solid residue above the valve builds up to such sensing means.

Figure 2:
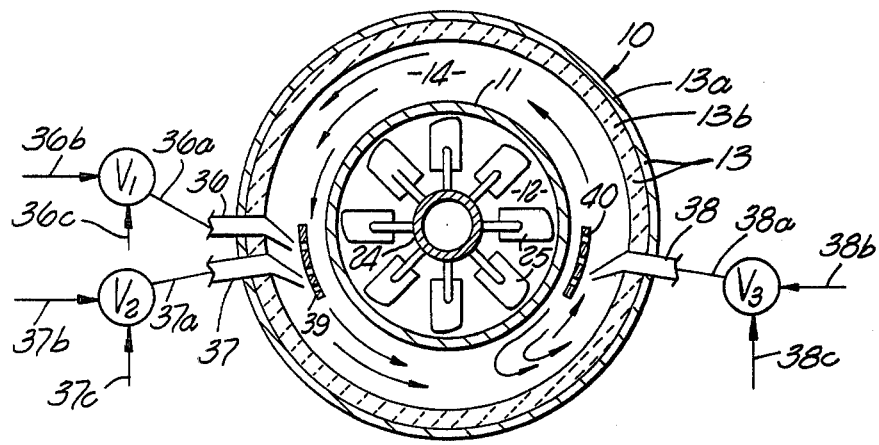
FIG. 2 is a sectional view of the pyrolysis apparatus of the present invention taken through line 2—2 of FIG. 1

The reaction vessel 11 and enclosed reaction zone 12 are heated by the combustion of fuel within the annular heating zone 14 defined by the reaction vessel and jacket 13. During start-up, the reaction zone 12 is brought up to pyrolyzing temperatures by fuel being burned in heating zone 14 and provided from a source external to the process. A preferred burner arrangement for the heating zone 14 is shown in FIG. 2. Burners 36 and 37 are positioned on one side of the jacket 13 with a third burner 38 being located on the opposite side of the jacket. Each of the burners 36, 37 and 38 (all located in the vicinity of the material outlet end of the system) projects the combustible air-fuel mixture issuing therefrom toward the lower portion of the heating zone 14 in a direction nearly tangential to the wall of vessel 11 and in a direction toward the material inlet end of vessel 11. Returning again to the matter of start-up, one of the burners, for example burner 36, is fed an appropriate air-fuel mixture through line 36a. The air-fuel mixture is regulated and controlled by a mixing and regulating valve $V_1$ which receives fuel through line 36b and air through line 36c. An appropriate igniter mechanism (not shown) is provided within the heating zone 14 adjacent the burner utilized as the start-up burner.

After the pyrolysis reaction zone 12 is heated by the start-up burner to a temperature at which the conversion of feed material is commenced and combustible off-gases are generated and processed through the associated gas-vapor treatment plant (described hereinafter), part or all of such combustible gases may be returned to the pyrolysis reaction system 10 for use as fuel for maintaining the pyrolysis reaction. In the full operational pyrolysis mode all of the burners 36, 37 and 38 are provided with an appropriate air-fuel mixture through lines 36a, 37a and 38a, respectively. The air-fuel mixture for each of the burners 36, 37 and 38 is regulated and controlled by mixing and regulating valves $V_1$, $V_2$ and $V_3$, respectively, each of which receives fuel through lines 36b, 37b and 38b, respectively, and air through lines 36c, 37c and 38c, respectively.

Figure 3:
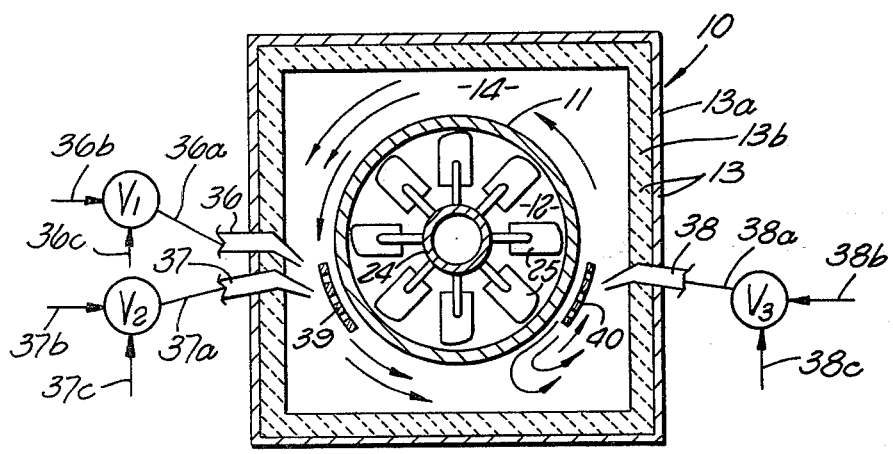
FIG. 3 is a sectional view of an alternative form of the pyrolysis apparatus of the present invention taken through line 2—2 of FIG. 1.

The arrangement of the burners is such that initially the burning air-fuel mixture of burner 38 moves annularly toward the burning air-fuel mixtures issuing from burners 36 and 37. Upon meeting, the burning mixtures of all burners are thoroughly mixed together annularly as a spiralling heating medium toward the material inlet end of the pyrolysis reaction system in a direction of rotation dictated by the dominant multiburner arrangement, i.e., burners 36 and 37, on one side of the jacket 13. It should be understood that the specific number and arrangement of burners firing into the heating zone 14 in the vicinity of the material outlet end of the reaction system may be altered to take into account variations in the volume, dimensions and cross-sectional configuration of the heating zone 14 (See FIG. 3 for an alternative cross-sectional configuration of the heating zone) and process heating requirements. It is important, however, that the selected burner combination and arrangement result in thorough mixing of the combustible and combusting air-fuel streams adjacent the lower portion of the reaction vessel (toward the middle thereof) and the development of a spiralling high temperature heating medium moving within the heating zone toward the material inlet end of the reaction system. As shown in FIG. 2 (also shown in FIG. 3), burner flame impingement baffles 39 and 40 may be positioned within the heating zone 14 to protect the reaction vessel 11 from excessive point heating and eventual damage. These baffles may be made of any of a variety of high temperature ceramic materials and are positioned and supported within the heating zone by any suitable structural means that can also withstand the high temperature environment of the heating zone.

The heating zone 14, as illustrated in FIG. 1, is tapered with progressively diminished cross-sectional annular area from the end wall 13d (proximate the outlet end of reaction zone 12) to end wall 13c (proximate the inlet end of the reaction zone). Further, the heating zone 14 is provided with a combustion gas outlet 41 with the completely burned exhaust gases being removed at such outlet through outlet conduit 42 and line 43 for utilization as a heating medium, as described hereinafter, or for discharge to atmosphere as a completely combusted, non-polluting exhaust gas stream. Thus, in accordance with the present invention, the heating medium developed within the heating zone (while spiralling about the reaction vessel 11) moves in a direction counter-current (within such zone) to the direction of movement of the materials reaction bed within the reaction zone 12 and such medium is progressively constricted and confined (in opposition to its normally expanding characteristic) by the heating zone configuration as it seeks the combustion gas outlet 41. It is normal in heater design that hot combustion gases within a heating zone are withdrawn from the upper portion of such a heating zone. It has been found that by progressively constricting the hot combustion gases in the present pyrolysis apparatus along their path of flow via the disclosed heating zone configuration and by locating the combustion gas outlet 41 at a point below a horizontal plane drawn through the axis of the jacket 13 (preferably in close proximity to the material inlet end of the reaction vessel 11), that the combustion exhaust gases are held within the heating zone for an optimum period of residence time and that upon leaving the heating zone their combustible constituents have been completely burned with the resulting gases being non-polluting to the atmosphere.

Gases and vaporized liquids generated from the solid carbonizable material introduced into the reaction vessel 11 by the pyrolysis reaction carried on therein, including small quantities of steam, leave the reaction vessel 11 through outlet 17 as a gas-vapor mixture and are withdrawn through a gas-vapor outlet conduit 44 by line 45 under a slightly negative pressure and in a manner so as to avoid the entrance of any oxygen-containing gases into the reaction zone 12. Residual gases or vapors, if any, entrained with the solid residue leaving the reaction zone 12 through outlet 16 may be separated from such residue by applying a negative pressure to a gas-vapor line 46 located adjacent the upper end of conveyor housing 31 of the solid residue conveying system 30. The gases and vapors of lines 45 and 46 are thereafter passed to an associated gas-liquid recovery system, generally indicated as 50, of appropriate and well-known design, wherein condensible vapors and non-condensible gases are separated from one another thereby yielding product liquids (broad range of liquid hydrocarbons) and combustible gas or gases (principally a mixture of $CO_2$, CO, $H_2$, $CH_4$, $C_2H_6$, $C_3H_8$, etc.) which may be passed to a gas storage facility, generally indicated as 51, and comprise the product gases produced by pyrolysis of solid carbonizable materials within the apparatus of the present invention. As hereinabove mentioned, product gas and/or gases of the pyrolysis conversion reactions are combustible and have a relatively high heating value (700–950 Btu/S.C.F. for gases recovered from scrap tire pyrolysis) making them most suitable, if desired, as the fuel source for pyrolysis burners 36, 37 and 38. Thus, process gas may be obtained from the gas storage facility 51 and passed via line 52 to burner fuel lines 36b, 37b and 38b.

As previously mentioned, hot combustion exhaust gases leave the heating zone 14 through outlet 41, conduit 42 and line 43. The heat value of these gases may be utilized in numerous ways, two of which are illustrated in FIG. 1. Thus, a portion of the hot exhaust gases may be led through line 60 to a header 61 which is rotatably connected to the pipe 24 which rotates during operation of the apparatus of this invention and which bears paddle-like impellers 25. The hot exhaust gases pass internally through pipe 24 thereby adding heat, by conduction through the pipe wall, to the organic materials being carbonized within reaction zone 12. The exhaust gases passing through pipe 24 exit same through a second header 62, which is likewise rotatably connected to pipe 24, and may then be passed to atmosphere through line 63. A further portion of the hot exhaust gases may be utilized to preheat the solid organic materials which are to be carbonized within the pyrolysis apparatus of the invention. Thus, a hot exhaust gas stream 70 may be lead to a heat exchanger 71 encasing the housing 21 of the material conveying system 20. After passing through exchanger 71 and giving up heat through housing 21 this portion of exhaust gases may be passed to atmosphere through line 72. Other wellknown heat economizing means may be employed in association with the combustion exhaust gas system to utilize the heating value of the exhaust gases. A further heat economizing step may be taken by jacketing the conveyor housing 31 of solid residue conveying system 30 with a heat exchanger 80 through which cooling water (entering through line 81) may pass and receive heat from the hot carbonaceous residues in the conveyor housing. The heated water exits the exchanger 80 through line 82 and may be utilized elsewhere in the plant system. The cooled carbonaceous residue or char proceeds through the remainder of the residue conveying system and into the solids recovery system 35.

In operation of the apparatus of the invention, carbonizable material, appropriately prepared for pyrolytic treatment (chopped, shredded, comminuted, etc.), is received by the feed material conveying system 20. Upon rotation of the auger 22 the feed material is moved to the upper end of housing 21 and to the material inlet conduit 18. The feed material descends downwardly by gravity through the upper portion of conduit 18 to rotary valve $RV_1$ and then downwardly through the lower portion of conduit 18 as an elongated packed column 19. Feed material from the packed column 19 is introduced into the pyrolysis reaction zone 12 through inlet 15 and is conveyed through the reaction zone 12 by the plurality of paddle-like impellers 25 circumferentially disposed in sequence about the rotatable pipe 24. Rotation of the paddle-like impellers 25 causes the material to be conveyed through the reaction zone 12 toward the outlet end as a continuously moving and agitated reaction bed RB of decreasing thickness from the inlet end to the outlet end. By internally heating the rotating pipe 24 more heating surface is available to the materials comprising the moving bed. Further, by increasing the diameter of the pipe 24 still further heating surface is made available to the materials bed since the annular space comprising the reaction zone 12 is decreased in annular dimension and rotation of the pipe and impeller system causes the materials to be carried further up and around the reaction vessel wall 11.

During pyrolysis, feed material is continuously introduced into the reaction zone 12 via material column 19. The descending material column 19 is maintained of sufficient length to effectively seal the reaction zone from oxygen-containing gases by introducing material to the top of the column through rotary valve $RV_1$ in response to material level sensing device $S_2$. Material is built up as a column above the rotary valve by feed auger 22 which is rotated by drive motor $M_1$ in response to material level sensing device $S_1$. The rotary valve and the upper material column in conduit 18 assist in sealing the inlet end of the reaction zone from oxygen-containing gases.

As previously stated, the feed material is passed through the pyrolysis reaction zone 12 in response to the rotation of pipe 24 and thus the forwardly conveying action of impellers 25, as a reaction bed RB (feed solids being converted to gases, vapors and solid residues). The reaction bed of decreasing thickness and semiannular cross-sectional configuration is agitated by the impellers 25 whereby the particulate or comminuted materials forming the bed are exposed to various parts of the bed and reactor walls and environment. Thus, the solid material of the bed is heated to pyrolyzing temperatures in the range of from about 400° C. to about 900° C. by conductive heat transfer passing through the wall of the reaction vessel below the bed surface and passing from particle-to-particle within the bed and by radiant heat transfer (emanating from the wall of the reaction vessel above the bed) to the upper surface of the bed. If pipe 24 is internally heated by hot combustion exhaust gases it too conducts and radiates heat which is transferred to and within the material bed and contributes to the heat of pyrolysis.

Solid carbonaceous residue formed within the pyrolysis reaction zone 12 is withdrawn from the reaction vessel 11 through outlet 16 and is formed (by gravity) into a packed column 27 within solids outlet conduit pipe 26 contributing to the sealing of the reaction zone from external oxygen-containing gases. As solid particulate residue (including non-carbonized materials contained in the reactor feed material) fills the conduit 26, a materials sensing device (not shown) closes electrical circuitry energizing motor $M_3$ and rotating solid residue auger 32 (within housing 31) at a rate and for a time to appropriately remove residue from the lower end of conduit 26 and convey same to the upper end of second column 34 contained within and defined by conduit 33. The solid residue in pipe 33 flows by gravity therethrough and is passed to solids recovery system 35. Intermediate the length of conduit 33 is a rotary valve $RV_2$ which is actuated in response to material level sensing device $S_3$ to pass material through the valve for passage through the lower portion of conduit 33 and to the solids recovery system 35. The solid residues within housing 31 and being conveyed by auger 32, and within conduit 33 cooperate with the solid residue in outlet conduit 26 effectively to seal the reaction zone at its outlet end from oxygen-containing gases. Depending upon the nature of the solid carbonizable feed material introduced into the pyrolysis system, the solid residue will be comprised of coke, charcoal, char, carbon black, ash, and non-carbonizable materials contained in the feed material (and mixtures of the foregoing). The coke, charcoal and char materials may be utilized as a solid fuel. Carbon black and other charcoal-like residue materials may be particularly suitable for use as rubber additives. In addition, the charcoal-like substances may be used as sewage clarification materials, decolorization substances, or as filtering agents in water purification processes.

The gas-vapor mixture (resulting from the pyrolysis of carbonizable materials of the type capable of being processed by the apparatus of the present invention) is withdrawn from the reaction zone 12 through gas-vapor outlet 17 and is passed through conduit 44 and gas-vapor line 45 to the gas-liquid recovery system 50. The passage of such mixture from the reaction system to the recovery system may be assisted by the application of a slightly negative pressure to the line 45 by apparatus of the type normally comprising a component of such a recovery system. As previously described, the gas-vapor mixture comprises valuable fuel gases, condensible oil and small quantities of steam and entrained solid carbonaceous particles. The oil comprises a complex mixture of aliphatic, olefinic and aromatic hydrocarbon products. Within the gas-liquid recovery system one or more fractions of heavy, medium heavy and light oils are condensed and collected for use and/or further treatment by well-known methods.

Since the material to be treated within the apparatus of the invention is maintained as a moving reaction bed RB of decreasing thickness from inlet to outlet ends of the reaction zone, three areas of reaction treatment are effectively established therein and generally comprise: a material preheat area wherein the bed is relatively thick (adjacent the inlet end); a principal pyrolysis reaction area along the mid-section of the reaction zone 12 wherein the bed of decreasing thickness is heated to maximum pyrolyzing temperatures; and a final reaction area wherein the substantially carbonized residual material is lightly agitated and advanced as a relatively thin bed to the solid residue outlet 16 of the reaction zone. Within the final reaction area essentially complete carbonization of the feed material at the final reaction temperature (considerably reduced in size via the pyrolysis or destructive distillation reactions occuring within the reaction zone) is accomplished.

As previously noted, the materials reaction bed developed within and moving through the reaction zone is of decreasing thickness from inlet to outlet ends. Thus, the effective material throughput volume of the reaction zone is approximately one-half of the actual volume of such zone. This differential between effective volume and actual volume is reduced when a larger diameter pipe 24 is utilized as the shaft for bearing the paddle-like impellers which convey the feed materials through the reaction zone. The reactor turnover-time or material throughput rate for the pyrolysis reactor system is established for each type of carbonizable feed material in relation to the bulk density of the material. The specific pyrolysis temperature conditions (within the preferred general temperature range) established within the reaction zone 12, via the heat generated in the surrounding heating zone 14, principally dictate the quantity distribution and nature of the fuel gases and liquid hydrocarbons produced during pyrolysis and the amount and nature of the carbonaceous material comprising the solid residual portion of the products of the pyrolysis reaction.

There has thus been described apparatus in which it is feasible to carbonize economically solid carbonizable material, particularly organic waste material, to form combustible gases, condensible hydrocarbons and solid carbonaceous residue by high temperature pyrolysis utilizing a heating system which results in complete combustion of the heating air-fuel medium and a residual exhaust gas stream which is non-polluting to the environment. It is obvious that one skilled in the art may make modifications in the details of construction of the apparatus described without departing from the spirit of the invention which is set out in varying scope in the appended claims.

What is claimed is:

1. Apparatus for pyrolyzing comminuted solid organic materials to form a hydrocarbon gas-vapor mixture and a solid carbonaceous residue which comprises:
   (a) a substantially horizontally disposed elongated tubular reactor vessel having end walls and forming a pyrolysis reaction zone, said vessel having a solid materials inlet conduit at one end thereof and a solid residue outlet conduit and a gas-vapor mixture outlet conduit at the other end thereof;
   (b) a jacket arranged coaxially around said reactor vessel and having end walls thereby forming an annular heating zone with said vessel, said reactor vessel presenting an inner heating zone wall of substantially uniform diameter throughout its length and said jacket presenting an outer heating zone wall of substantially uniformly decreasing dimension from the forward end of said heating zone proximate the outlet conduits of the pyrolysis reaction zone to the rearward end of said heating zone proximate the inlet conduit of said reaction zone whereby the annular cross-sectional area of the heating zone is of uniform configuration throughout the length of said zone and decreases substantially uniformly from said forward end to said rearward end, and said jacket having an exhaust gas outlet conduit positioned at a point below said reactor vessel and proximate the rearward end of said heating zone;
   (c) feed means in communication with said solid materials inlet conduit for introducing comminuted solid organic materials into said reactor vessel through said solid materials conduit under conditions to effectively exclude oxygen-containing gases therefrom;
   (d) means for conveying said comminuted solid organic materials through said vessel as an agitated moving bed of said materials;

(e) multiple burner means for introducing combusting mixtures of fuel and air into said annular heating zone tangentially to the wall of the reactor vessel for heating said vessel, said means being disposed so as to cause said combusting mixtures to spirally pass through said heating zone about said reactor vessel to said exhaust gas outlet conduit in a direction generally counter-current to said agitated moving bed of said comminuted solid organic materials;

(f) outlet means in communication with said solid residue outlet conduit of said reactor vessel for removing said solid residue from said vessel through said conduit under conditions to effectively exclude oxygen-containing gases therefrom; and (g) outlet means in communication with said gas-vapor mixture outlet conduit of said reactor vessel for withdrawing said mixture from said vessel under conditions to effectively exclude oxygen-containing gases therefrom.

2. Apparatus as defined in claim 1 in which said jacket is circular in cross-sectional configuration throughout its length and extends substantially co-extensively with said tubular reactor vessel.

3. Apparatus as defined in claim 1 in which said jacket is rectangular in cross-sectional configuration throughout its length and extends substantially co-extensively with said tubular reactor vessel.

4. Apparatus as defined in claim 1 in which said means for conveying said comminuted solid organic materials through the reactor vessel includes a rotatable shaft centrally positioned within said vessel throughout the length thereof, said shaft having mounted thereon a plurality of paddle-like impellers arranged as a broken helix over the length thereof.

* * * * *